US008763768B2

(12) United States Patent
Lathwesen

(10) Patent No.: US 8,763,768 B2
(45) Date of Patent: Jul. 1, 2014

(54) BRAKE DISC AND METHOD FOR MANUFACTURING A BRAKE DISC

(75) Inventor: Holger Lathwesen, Heigenhausen (DE)

(73) Assignee: Sheet Cast Technologies GmbH, Ingolstadt (DE)

( * ) Notice: Subject to any disclaimer, the term of this patent is extended or adjusted under 35 U.S.C. 154(b) by 156 days.

(21) Appl. No.: 13/133,302

(22) PCT Filed: Dec. 8, 2009

(86) PCT No.: PCT/EP2009/066656
§ 371 (c)(1),
(2), (4) Date: Jun. 7, 2011

(87) PCT Pub. No.: WO2010/066753
PCT Pub. Date: Jun. 17, 2010

(65) Prior Publication Data
US 2011/0240422 A1    Oct. 6, 2011

(30) Foreign Application Priority Data

Dec. 8, 2008  (DE) .......................... 10 2008 054 397
Jun. 19, 2009 (DE) .......................... 10 2009 027 063
Jun. 23, 2009 (DE) .......................... 10 2009 027 116

(51) Int. Cl.
*F16D 65/00*    (2006.01)

(52) U.S. Cl.
USPC .............................. 188/218 XL; 188/264 AA

(58) Field of Classification Search
CPC ..... F16D 65/12; F16D 65/123; F16D 65/128; F16D 2065/13; F16D 2065/1328; F16D 2065/1308; F16D 2065/134; F16D 2065/1344
USPC .... 188/218 XL, 71.6, 264 R, 264 A, 264 AA
See application file for complete search history.

(56) References Cited

U.S. PATENT DOCUMENTS

| | | | | |
|---|---|---|---|---|
| 2,423,056 A | * | 6/1947 | Tarbox | 188/218 XL |
| 4,501,346 A | * | 2/1985 | Bogenschutz | 188/218 XL |
| 4,712,656 A | * | 12/1987 | Courtois | 188/218 XL |
| 4,853,574 A | * | 8/1989 | Estaque | 310/105 |
| 5,107,966 A | * | 4/1992 | Metzler et al. | 188/251 M |
| 5,161,652 A | * | 11/1992 | Suzuki | 188/218 XL |

(Continued)

FOREIGN PATENT DOCUMENTS

| | | |
|---|---|---|
| DE | 1 575 748 | 1/1970 |
| DE | 25 57 649 | 6/1977 |

(Continued)

OTHER PUBLICATIONS

International Search Report, Mar. 8, 2010.

(Continued)

*Primary Examiner* — Thomas Irvin
(74) *Attorney, Agent, or Firm* — Dority & Manning, P.A.

(57) ABSTRACT

A brake disk has a brake disk friction ring and a brake disk chamber that includes a chamber ring and expansion elements arranged radially on the chamber ring, and connected on their ends facing away from the chamber ring to the brake disc friction ring in a non-floating, positive manner in the radial direction. The expansion elements are longer than the shortest distance between the chamber ring and the brake disc friction ring and are radially elastic so as to adapt to thermal deformation of the brake disc friction ring.

13 Claims, 6 Drawing Sheets

(56) References Cited

U.S. PATENT DOCUMENTS

| | | | |
|---|---|---|---|
| 5,279,396 A * | 1/1994 | Estaque et al. | 188/264 A |
| 5,460,249 A * | 10/1995 | Aoki | 188/218 XL |
| 6,164,423 A * | 12/2000 | Dickerson | 188/218 XL |
| 6,241,055 B1 * | 6/2001 | Daudi | 188/73.35 |
| 6,957,725 B2 | 10/2005 | Runels | |
| 7,600,614 B2 | 10/2009 | Doppling et al. | |
| 2004/0124045 A1 | 7/2004 | Mathern | |
| 2007/0199778 A1 * | 8/2007 | Lee | 188/218 XL |
| 2008/0073165 A1 | 3/2008 | Rau et al. | |
| 2010/0206675 A1 * | 8/2010 | Miyake et al. | 188/218 XL |
| 2011/0061980 A1 * | 3/2011 | Anderson | 188/218 XL |
| 2011/0127125 A1 * | 6/2011 | Finch et al. | 188/218 XL |
| 2012/0090929 A1 * | 4/2012 | Lathwesen | 188/218 XL |
| 2012/0125725 A1 * | 5/2012 | Tironi et al. | 188/218 XL |

FOREIGN PATENT DOCUMENTS

| | | |
|---|---|---|
| DE | 40 03 732 A1 | 8/1991 |
| DE | 102 34 104 B3 | 3/2004 |
| DE | 10 2004 008 958 A1 | 9/2005 |
| DE | 10 2007 013 512 A1 | 9/2008 |
| EP | 2 048 404 | 4/2009 |

OTHER PUBLICATIONS

International Preliminary Report on Patentability, Jun. 23, 2011.
German Patent Office Search Report, Oct. 7, 2009.

* cited by examiner

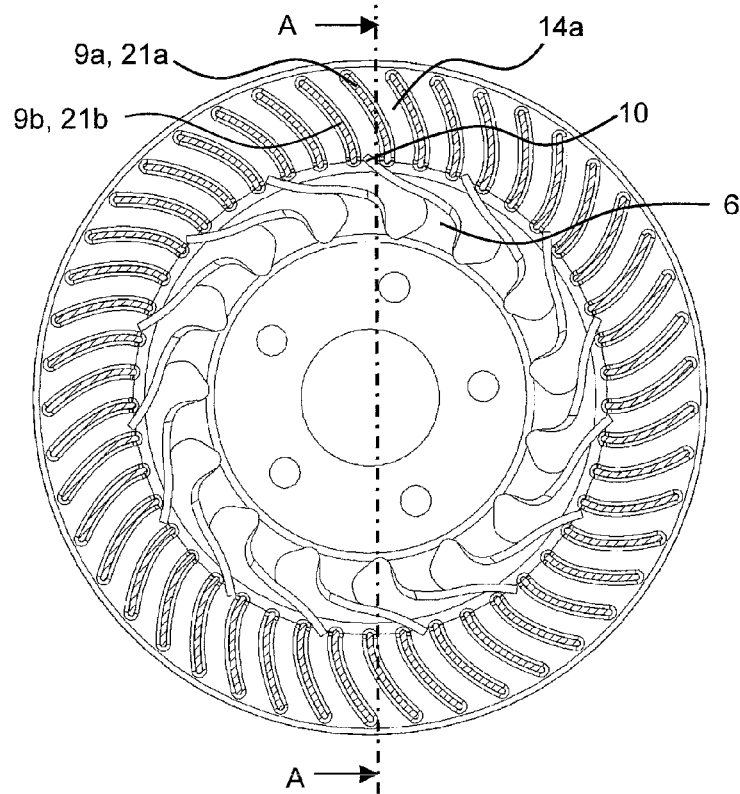
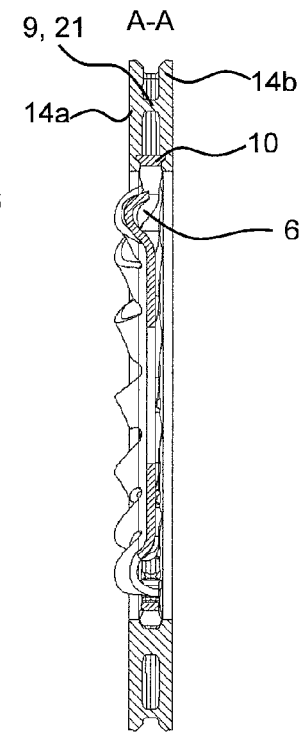
Fig. 3       Fig. 4
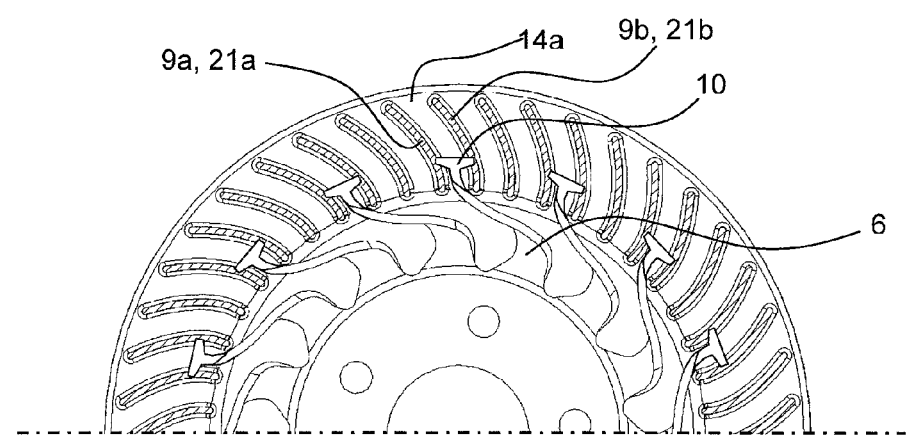
Fig. 5

BRAKE DISC AND METHOD FOR MANUFACTURING A BRAKE DISC

FIELD OF THE INVENTION

The present invention relates to a brake disk, especially for motor vehicles, with a brake disk friction ring and a brake disk chamber, consisting of a chamber ring and expansion elements arranged radially on the chamber ring, preferably on the outer circumference of the chamber ring, and connected on their end facing away from the chamber ring to the brake disk friction ring in the radial direction in a positive and/or bonded manner. Furthermore, the present invention relates to a method for manufacturing such a brake disk, in which the expansion elements are surrounded in a positive and/or bonded manner in the radial direction in a brake disk friction ring that has friction surfaces, and in a chamber ring with support surfaces.

BACKGROUND

Braking procedures entail, as a rule, a strong heating of the brake disk friction ring. Since high thermo-mechanical stresses between the brake disk chamber and the friction ring result from the temperature gradient in the direction of the brake disk chamber, it is necessary to protect against thermal loads on the wheel bearing. In one-part brake disks, the shielding of the brake disk friction ring is part of the cause of the so-called dry brake rubbing.

In order to avoid this effect, a brake disk is known from DE 10 2007 013 512 A1 that comprises a radially inner chamber and a radially outer friction disk, whereby the friction disk has connection webs that are positively cast and without bonding in a casting process to the radially inner chamber.

This has the disadvantage in that the shielding of the brake disk friction ring is not compensated exclusively via a primarily desired radial shifting of the friction disk to the inner chamber, but rather an axially parallel shifting also takes place that can be controlled only with difficulty and necessarily results in a low shielding.

Furthermore, it proves to be disadvantageous that care must absolutely be taken during the casting process in that the carrying part is poured without bonding to the radially inner ends of the connection webs. Only then is it ensured that the connection webs can radially shift vis-à-vis the carrying part in the case of a radially expanding friction disk conditioned by heat, in order to avoid critical thermal stresses. This absolute prerequisite of avoiding bonding sharply limits the free selection of material for the connection webs as well as the structural component to be cast. A bonding is not necessarily excluded even in the case of differing melting points of the connection webs and of the material to be poured around, but rather special measures are necessary in the framework of the pouring procedure, which must also be carefully monitored.

In view of this, the present invention addresses the problem of creating a brake disk, for example, for a passenger car, commercial vehicle, or rail vehicle, as well as a method for the manufacture of such a brake disk in which the brake disk friction ring is connected in a simple and, therefore, an economical manner to the brake disk chamber, thermo-mechanical stresses between the two structural components during the braking procedure are largely excluded and weight savings can be achieved by a relatively free selection of the material of the individual components.

The problem is solved by a brake disk, as well as by a method for the manufacture of such a brake disk, in accordance with aspects of the present invention.

SUMMARY

Objects and advantages of the invention are set forth in part in the following description, or may be obvious from the description, or may be learned through practice of the invention.

According to the invention, the brake disk comprises a brake disk friction ring and a brake disk chamber, whereby the brake disk chamber consists of a chamber ring and expansion elements that are arranged radially on the chamber ring, preferably on the outer circumference of the chamber ring, and are positively connected on their ends facing away from the chamber ring to the brake disk friction ring. The expansion elements are connected in a positive and/or bonded manner to the brake disk friction ring and/or to the chamber ring in the radial direction. This advantageously ensures a very firm connection, especially in the radial direction of the brake disk.

Consequently, in contrast to the state of the art, there is no floating connection between the expansion elements and/or the brake disk friction ring and/or the chamber ring, which connection is normally absolutely necessary in the case of customarily-designed expansion elements for compensating the heat-conditioned radial expansion of the brake disk friction ring in order to avoid a shielding of the brake disk. In contrast to the above, the expansion elements of the brake disk in accordance with certain embodiments of the invention are designed in such a manner that they are on the one hand longer than the shortest distance between the chamber ring and the brake disk friction ring, and on the other hand, are designed to be radially elastic. As a result, an adaptation of the brake disk friction ring to the thermal expansion of the brake disk friction ring can take place, so that thermo-mechanical stresses can be greatly reduced between the brake disk friction ring and the brake disk chamber.

The brake disk friction ring can freely enlarge its radius under heating and freely reduce it when cooling off, since it is not directly coupled to the chamber ring, but rather indirectly via the expansion elements that are designed to be radially elastic and, therefore, adapt to the temperature-dependent radius of the brake disk friction ring by a reversible changing of length. Therefore, a shielding of the brake disk friction ring is largely excluded since the thermal-mechanical stresses are preferably compensated by an exclusively radial shifting between the brake disk friction ring and the chamber ring with a simultaneous firm and/or bonded coupling in the radial direction via the expansion elements. An axially parallel shifting between the brake disk friction ring and the chamber ring that can possibly take place can be regulated by the appropriate shaping of the expansion elements that are longer than the shortest distance between the chamber ring and the brake disk friction ring, in such a manner that it becomes negligibly small. Furthermore, the wheel bearing is better protected against heat by the thermal decoupling of the brake disk friction ring from the chamber ring by the expansion elements, since less thermal energy is transferred from the brake disk friction ring to the chamber ring via the lengthened thermal transfer stretch.

The brake disk of the invention is suitable, on account of the very low shielding, for very different braking systems, in particular, for fixed yoke brakes that have a very low shielding tolerance.

It is especially advantageous if the number of expansion elements arranged on the brake disk chamber is a prime number and the brake disk therefore has at least three, but preferably nineteen expansion elements. In this manner, the properties of the brake disk regarding strength, weight, radial elasticity, oscillation behavior, and damping behavior can be ideally influenced in order to be able to achieve excellent braking properties with maximum braking comfort at the same time. As regards the oscillating behavior, a prime number of expansion elements is, therefore, advantageous since a stimulation of the brake disk friction ring in the area of its eigen frequency is almost excluded. Alternatively, the number of expansion elements can, of course, also be a number other than a prime number. Moreover, the axially parallel shifting properties of the brake disk friction ring relative to the chamber ring can change with the number of the expansion elements. This property can be changed in such a manner that the axially parallel shifting is sharply reduced by a purposeful variation of the number of connection elements.

It is preferable that the chamber ring and the expansion elements are manufactured from the same material and/or in one piece. In this manner, an insert can be very simply and economically manufactured in the frame of a manufacturing process by one or more separating methods, shaping methods, and master-pattern methods from, for example, one sheet, which the insert could have varying sheet thicknesses and preferably be connected in a positive and/or bonded manner in the following casting procedures to a brake disk friction ring in a radial direction. This produces a high-performance brake disk that is, furthermore, distinguished by low manufacturing costs. As a result of the varying sheet thickness, the radial elasticity of the expansion element can be positively influenced and the axially parallel shifting of the brake disk friction ring vis-à-vis the chamber ring can be controlled. Alternatively, the insert, consisting of chamber ring, one or more expansion elements, and/or segments, and respective cooling ribs, can consist of a nonferrous metal, carbon, and/or a plastic. An additional weight reduction could advantageously be achieved when using these materials.

Alternatively, is just as advantageous if the chamber ring and the expansion elements are manufactured from different materials. Depending on the specific requirements of the individual structural parts, the most suitable materials can be selected in this manner in order to ensure, for example, an ideal radial elasticity of the expansion elements, as well as a low weight and a high strength of the chamber ring.

It is especially preferable if the expansion elements are connected in a bonded manner to the brake disk friction ring and/or the chamber ring. This practically excludes a loosening of the expansion elements from the brake disk friction ring and/or the chamber ring if a friction disk widens out radially due to heat, since rather large traction forces can be received by the positive and bonded connection between the expansion elements and the brake disk friction ring and/or the chamber ring. The same applies to braking procedures in which the expansion elements are loaded with traction. The bond is not obligatorily necessary for a secure connection on account of the assumed positive locking in the radial direction. However, it furthermore favors a freer selection of material for the expansion element as well as for the chamber ring and/or brake disk friction ring, since the structural parts to be connected to each other may be subject to greater melting-point tolerances with an allowed bonding.

As a result of the fact that the radial elasticity of the brake disk constituting the basis of the invention is realized by the connection elements themselves, and not as in solutions of the state of the art, by a bond that is absolutely to be avoided and that can only be controlled with great difficulty from a casting viewpoint, the manufacturing process of such a brake disk is simplified.

It is especially advantageous if the expansion elements have a radial and an axial width that are not identical to one another in the area of the connection to the brake disk friction ring and/or to the chamber ring, which connection is positive and/or bonded in the radial direction. The radial and/or axial resistance moments can be influenced by the radial and/or axial width of the expansion elements in the area of the connection, which is positive and/or bonded in the radial direction. The wider the expansion elements are constructed in the appropriate dimension, the greater the corresponding resistance moment is, also. It is especially advantageous for the reduction of the axially parallel shifting of the brake disk friction ring, and for favoring its radial elasticity, if the axial width of the expansion elements in the area of the connection, which is positive and/or bonded in the radial direction, to the brake disk friction ring and/or to the chamber ring, is selected to be large and the radial width is selected to be small.

In order to ensure the most ideal possible radial elasticity of the expansion elements, it is advantageous if each of the two adjacent expansion elements are arranged at a distance from one another. This distance between two adjacent expansion elements, furthermore, favors the cooling of the brake disk chamber as well as a reduced heat transfer from the brake disk friction ring to the chamber ring and/or to the wheel bearing, that is to be protected from heat.

It is also advantageous if the expansion elements have a freeform geometry and/or an involute geometry in longitudinal section and/or in cross section, since this can very readily achieve maximum strengths of the expansion elements as a function of the loading situation that would, alternatively, have to be brought about by thicker cross sections of the expansion elements and, consequently, greater weight. The expansion elements can have concave as well as convex freeform geometries. The involute geometry of the expansion elements changes their shape, in particular their radius substantially in exclusively two dimensions. In addition, the axially parallel shifting of the brake disk friction ring relative to the chamber ring can be reduced to a negligibly low value by the appropriately reinforcing shaping of the expansion elements.

In regards to an economical brake disk, it is advantageous if the expansion elements are manufactured from steel sheeting. This has the advantage that the expansion elements can be brought into the desired form by simple shaping and separating methods, which form ensures sufficient strength and at the same time an ideal radial elasticity under thermo-mechanical loads. In a preferred embodiment, the expansion elements consist of high-grade steel sheeting, since this offers the further advantage of corrosion resistance.

It is also advantageous if the expansion elements are arranged punctually, symmetrically, and/or axially symmetrically, since in the case of a thermal deformation of the brake disk friction ring, a uniform centric shifting of the brake disk friction ring is favored and, thus, a shielding or irregular deformation of the brake disk friction ring is avoided.

Alternatively, it can be advantageous in special applications if the expansion elements are asymmetrically arranged. In this manner, a special influencing of the oscillation behavior of the brake disk is possible so that a stimulation in the area of the eigen frequency of the brake disk can be excluded to a great extent.

Another advantageous embodiment of the invention consists of a brake disk that has a primary direction of rotation and with ends of the expansion elements facing away from the chamber ring face in and/or against the primary direction of rotation of the brake disk. It is, therefore, possible to achieve an ideal strength as a function of the two loading instances, forward travel and reverse travel, by a specific alignment of the expansion elements, in that the expansion elements are loaded with pressure and/or traction. Moreover, it is possible to positively influence the oscillation behavior and the damping behavior of the brake disk by an appropriate aligning of the expansion elements. In regards to the fact that the chamber ring and the expansion elements of the brake disk friction ring are manufactured in a preferred embodiment from the same material and in one piece, it is advantageous if all expansion elements are aligned in the same direction of rotation. Thus, in the manufacture of the brake disk chamber from, for example, a single sheet the available surface of the raw sheet is ideally utilized and the maximally possible number of expansion elements is achieved.

It is especially preferred that the cross section of the expansion elements changes, especially becoming smaller, starting from the end facing the chamber ring to the end facing away from the chamber ring. This favors an ideal radial elasticity of the expansion elements without having to accept losses of strength. The same is favored if the expansion elements have at least one, but preferably two, theoretical bending areas determined by the cross section, in which areas the expansion elements are bent in the axial and/or radial direction of the brake disk. If the diameter of the brake disk friction ring becomes larger during the braking procedure on account of the resulting thermo-mechanical loading, then the shaping of the expansion elements compensates the undesired thermo-mechanical stresses between brake disk friction ring and brake disk chamber by a reversible, radial longitudinal enlargement of the expansion elements. In the ideal case an exclusively radial shifting of the brake disk friction ring results from the specific shaping of the expansion elements. However, in certain circumstances, a slight parallel shifting can take place in the axial direction of the brake disk friction ring that, however, can be controlled by the bendings in the axial and the radial direction and/or by the shaping of the expansion elements, so that the axially parallel shifting to be reduced becomes negligibly small. Both shifting variants largely avoid a shielding of the brake disk friction ring.

It is also advantageous if the expansion elements have a shape that supplies cold air, so that the wheel bearings are protected from overheating not only by the thermal decoupling of the brake disk friction ring and the chamber ring, but also additionally by convection. Moreover, the shape of the expansion elements which supplies cold air is advantageous for cooling the brake disk friction ring.

It is especially advantageous if the expansion elements have an undercut, in particular, a hammerhead, on the end facing the brake disk friction ring so that a firm anchoring to the brake disk friction ring is ensured under loading with traction or pressure. Moreover, the hammerhead has the further advantage that it can be manufactured very simply by, for example, cutting or stamping from a plane sheet blank. However, even alternative undercut forms are conceivable such as, for example, arrowhead, trapezoid, or ball end.

It is also advantageous if the expansion elements are formed according to requirements of strength and expansion and in accordance with aesthetic viewpoints so that they contribute, for example, in the case of rims with coarse spokes, to a pleasant appearance of the entire vehicle.

It is especially advantageous if the connection between the expansion elements and the brake disk friction ring and/or the chamber ring, which connection is positive and/or bonded in the radial direction, is manufactured with casting technology. This constitutes a simple and economical connection that can be quickly manufactured and that requires no additional structural components, such as, for example, bolts or screws. It is especially advantageous if the structural part to be cast, the brake disk friction ring, and/or the chamber ring consists of nonferrous metal, gray cast iron or high-grade steel cast metal. Non-ferrous metals are especially advantageous on account of their weight savings. Ferrous metals are especially suited on account of their splendid friction properties as cast metal material, whereby high-grade cast steel has the additional advantage of corrosion resistance. Alternatively, the brake disk friction ring can be connected positively and/or bonded in the radial direction to the expansion elements, but can also consist of ceramic material.

If the brake disk friction ring is stamped solidly without intermediate spaces, it is advantageously not as susceptible to corrosion. Alternatively, it is advantageous in special applications if the brake disk friction ring consists of a brake disk friction band pair that is connected to one another by segments, especially cooling ribs facing in the primary direction of rotation. Thus, the heating of the brake disk friction ring can be reduced by using convection. The segments are ideally symmetrically arranged in order to avoid an uncontrolled deformation of the brake disk upon thermal or mechanical loading.

Moreover, it proves to be especially advantageous if at least one expansion element is connected in a positive and/or bonded manner in the radial direction to one of the segments. This ensures a very firm connection between the expansion element and the brake disk friction ring, since the entire connection end of the expansion element that is preferably formed as a hammerhead, is surrounded positively and/or in a bonded manner in the radial direction by the segment. In particular, under a traction load this connection prevents the expansion element from sliding out of the brake disk friction ring.

Alternatively or additionally, it is just as advantageous if at least one expansion element is arranged between two segments and between the brake disk friction band pair and is connected in a positive and/or bonded manner in the radial direction to at least one of the segments. As a result, the segments can be constructed to be relatively slender, so that so-called hotspots are avoided by the reduced accumulations of mass. The same thing is brought about, in that at least one expansion element is arranged in an especially advantageous manner between two segments and between the brake disk friction band pair and is connected in a positive and/or bonded manner in the radial direction to the brake disk friction band pair.

It is preferable if the brake disk chamber consists of several structural parts, since different materials can be used in regards to the different requirements of the chamber ring and of the expansion elements in order to optimize the total properties of the brake disk chamber regarding radial elasticity, strength, isolation behavior, and damping behavior.

The brake disk chamber is exposed to very strong mechanical stresses, in particular in commercial vehicles, rail vehicles, and highly motorized passenger vehicles. In this case it is especially advantageous if the brake disk chamber consists of two or more steel sheets arranged superimposed over each other.

It is especially preferred if the brake disk chamber consists of a cast chamber ring and of one or more expansion elements of steel sheeting that are connected in a positive and/or bonded manner to the chamber ring in the radial direction.

This can influence the damping properties as well as the oscillation properties and bring about an optimum distribution of weight.

In a method in accordance with the invention for manufacturing brake disk, the radially inner ends of the expansion elements are advantageously cast positively and in a bonded manner in the radial direction to the chamber ring, and the radially outer ends of the expansion elements are cast to the brake disk friction ring, whereby the cast brake disk friction ring and the chamber ring are cast in one piece to one or more connection elements that rigidly connect the brake disk friction ring and the chamber ring to one another in one piece. Subsequently, the friction surfaces are rigidly connected to each other by the connection elements and the support surface of the chamber ring are faced so that a quiet running and a shudder-free braking of the brake disk are ensured. Then, in order to finish working the brake disk, the connection elements between the brake disk friction ring and the chamber ring are separated so that the chamber ring and the brake disk friction ring are connected to one another exclusively by the expansion elements. In addition to the rapid and economical manufacture of the brake disk, the method has the further advantage in that an effective and efficient working of the friction surfaces and of the support surfaces can take place by the temporary connection of the chamber ring and of the brake disk friction ring via the connection elements without having to apply a serious axial stress on the expansion elements. Therefore, the expansion elements are protected from an axial overloading during the entire working process.

Before the actual pouring in of an insert can take place by means of which insert the chamber ring, one or more expansion elements and/or one or more segments or cooling ribs are entirely or at least partially formed, a core must be manufactured at first into which the insert or inserts are to be introduced before the casting around.

The manufacture of the core usually takes place by means of a core manufacturing tool. An insert is placed into this tool. After the closing of the core manufacturing tool sand is shot in, by means of which the core is formed. The core manufacturing tool is subsequently reopened. The insert is now introduced into the one-piece core in such a manner that exclusively contact areas are free. A shot-in insert is discussed here. In a subsequent casting method, the shot-in insert is cast on its contact areas positively or in a bonded manner in a radial direction to the brake disk friction ring and/or to the chamber ring.

The core can optionally be treated with a wash before the casting around. A wash is suspensions or dispersions of fireproof substances that are applied in the form of a thin coating on inserts, forms, cores or casting tools and must fulfill tasks such as thermal insulation, smoothing and/or separation. In the case of the shot-in insert, it proved to be problematic that the wash can not be applied on the entire surface of the core, since partial areas are in direct contact with the insert. Therefore, according to the invention, a bipartite core is manufactured into which the inserts can be placed in and taken out again so that the entire surface of the core can be coated with a wash.

In a method in accordance with the invention for the manufacture of a brake disk in which expansion elements are connected to a brake disk friction ring and to a chamber ring with casting technology, an insert is inserted in a first step between an upper part and a lower part of a bipartite core. The insert can form the expansion elements, the cooling ribs, and/or the chamber ring. The inserts can be constructed as a single part or in several parts. Alternatively, several inserts can also be used. After the core has been provided with the insert, the upper part is connected to the lower part. In an especially preferred embodiment, the upper part is adhered and/or stuck to the lower part. Then, the brake disk friction ring, consisting of two friction bands separate from one another, and/or the chamber ring with the inserts is cast positively and/or in a bonded manner in the radial direction.

Known solutions must avoid, in order to ensure the radial elasticity, under all circumstances, a bonded connection between the expansion elements and the brake disk friction ring and/or the chamber ring. However, this can only be controlled with great difficulty. In the case of the present method, this aspect advantageously does not have to be taken into account since the radial elasticity is brought about exclusively by the characteristic shaping of the expansion elements. Furthermore, the bond is desired since it advantageously improves the strength of the connection between the expansion elements and the brake disk friction ring and/or the chamber ring.

It is especially advantageous if the bipartite core is treated with a wash prior to the insertion of the inserts. Consequently, according to the invention, the surface of the lower part and of the upper part are treated, in particular sprayed with or immersed into such a wash, so that in particular the surface quality of the bipartite core is improved. This has the advantage that a more economical sand can be used for the manufacture of the core and/or of the upper form and lower form without having to accept losses in the quality of the cast brake disk.

In regards to an embodiment of the brake disk with reduced weight, it is especially advantageous if the brake disk friction ring is cast at first and only, subsequently, the chamber ring is cast with a non-ferrous metal. Nonferrous metals have the advantage, in comparison to ferrous metals, that they have a lower weight. It is important in the manufacture of this variant of an embodiment that the inserts are preheated during the casting of the chamber ring in order to obtain a perfect casting result.

It is also advantageous if, for reasons of saving weight, even the brake disk friction ring is cast from a lighter non-ferrous metal. However, since non-ferrous metals have a lower melting point in comparison to ferrous metals, there is the danger that the brake disk friction ring deforms during the braking under high loading, so that the braking power of the vehicle is sharply reduced. In order to counteract this effect, it is especially advantageous if the brake disk friction ring cast from a non-ferrous metal is coated in a subsequent method step for controlling the supplying of heat with a material whose melting point is so much higher in comparison to the non-ferrous metal that a melting of the brake disk friction ring is largely excluded.

Other advantages of the invention are described in the following exemplary examples.

BRIEF DESCRIPTION OF THE DRAWINGS

FIGS. 3 and 4 show a brake disk in cross section in which the brake disk chamber is connected to the brake disk friction band pairs;

FIG. 5 shows a section through an alternate embodiment of a brake disk in which the brake disk chamber is connected to two segments of the brake disk friction ring;

DESCRIPTION

Figure 1:
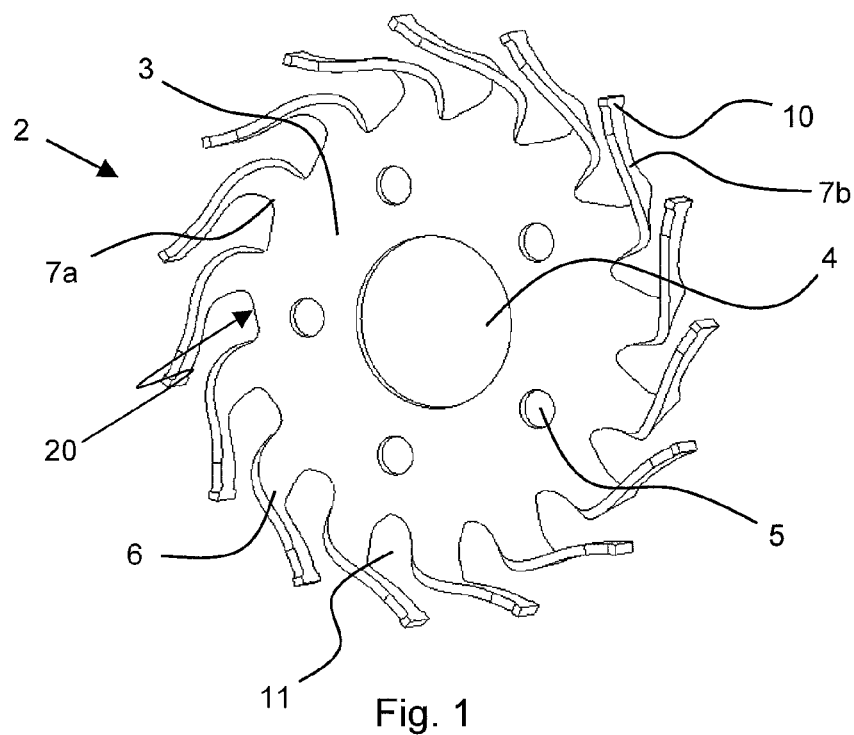
FIG. 1 shows a perspective view of a brake disk chamber constructed as an insert.

Reference is now made to particular embodiments of the invention, one or more examples of which are illustrated in the drawings. Each embodiment is provided by way of explanation of the invention, and not as a limitation of the invention. For example, features illustrated as described as part of one embodiment may be used with another embodiment to yield still a further embodiment. It is intended that the present invention include these and other modifications and variations.

FIG. 1 shows an exemplary embodiment of a brake disk chamber 2 comprising a chamber ring 3 and expansion elements 6. Chamber ring 3 comprises a centrally arranged centering 4 and screw holes 5, so that a centered fastening of the brake disk chamber on a shaft can be performed. Expansion elements 6 are manufactured from the same material as chamber ring 3 in one piece and, therefore, form a one-piece insert 20. Expansion elements 6 are arranged on the outer circumference of chamber ring 3 and separated from each other by free material spaces 11 and face with their end facing away from chamber ring 3 in the primary direction of rotation of brake disk 1. This ensures that expansion elements 6 are loaded primarily with pressure during the braking procedure. Moreover, an ideal use of material in the manufacture of one-piece brake disk chamber 2 by, for example, cutting or stamping of the free material spaces can be achieved by the uniform arrangement of all expansion elements 6 in one direction of rotation.

Alternatively, individual expansion elements 6 can be aligned counter to the primary direction of rotation, while retaining the symmetry in order to ensure a sufficiently high strength of brake disk chamber 2, even in braking procedures from a rapid reverse travel.

Figure 8:
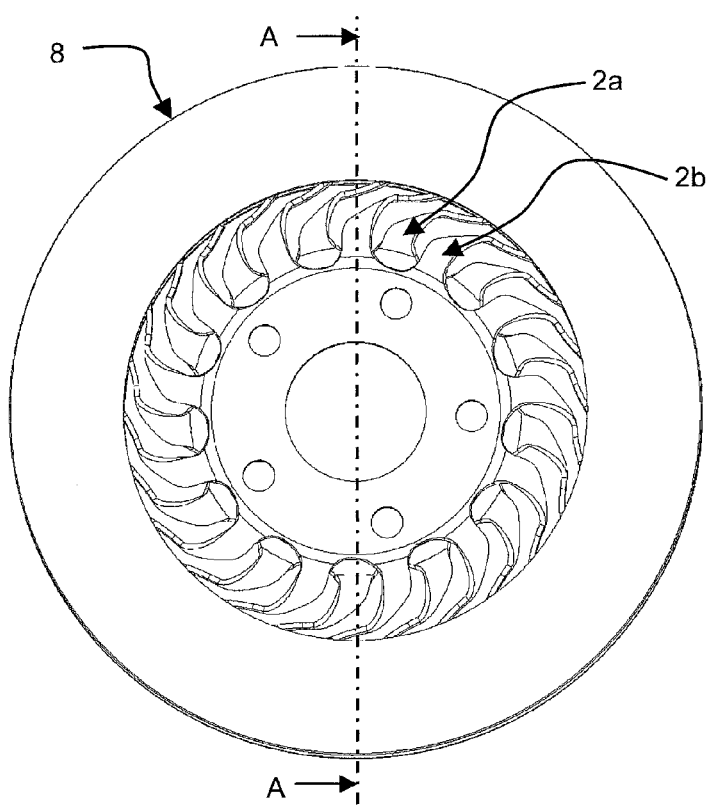
FIGS. 8 and 9 show a section through an alternate embodiment of a brake disk in which two brake disk chambers are connected to the brake disk friction ring.

Expansion elements 6 have tapered areas 7a, 7b, in which the cross section of expansion elements 6 is reduced. Theoretical bending areas of expansion elements 6 are determined by these tapered areas 7a, 7b. In these areas, expansion elements 6 are bent in a special manner during the manufacture of one-piece brake disk chamber 2 or insert 20. In the exemplary embodiment shown, expansion elements 6 are outwardly bent in the area of tapered area 7a in the axial direction and in the area of tapered area 7b in the radial direction. Furthermore, each expansion element 6 comprises a hammerhead 10 on its end, which the hammerhead forms an excellent positive locking in the radial direction between expansion elements 6 and brake disk friction ring 8 (FIG. 8).

Figure 2:
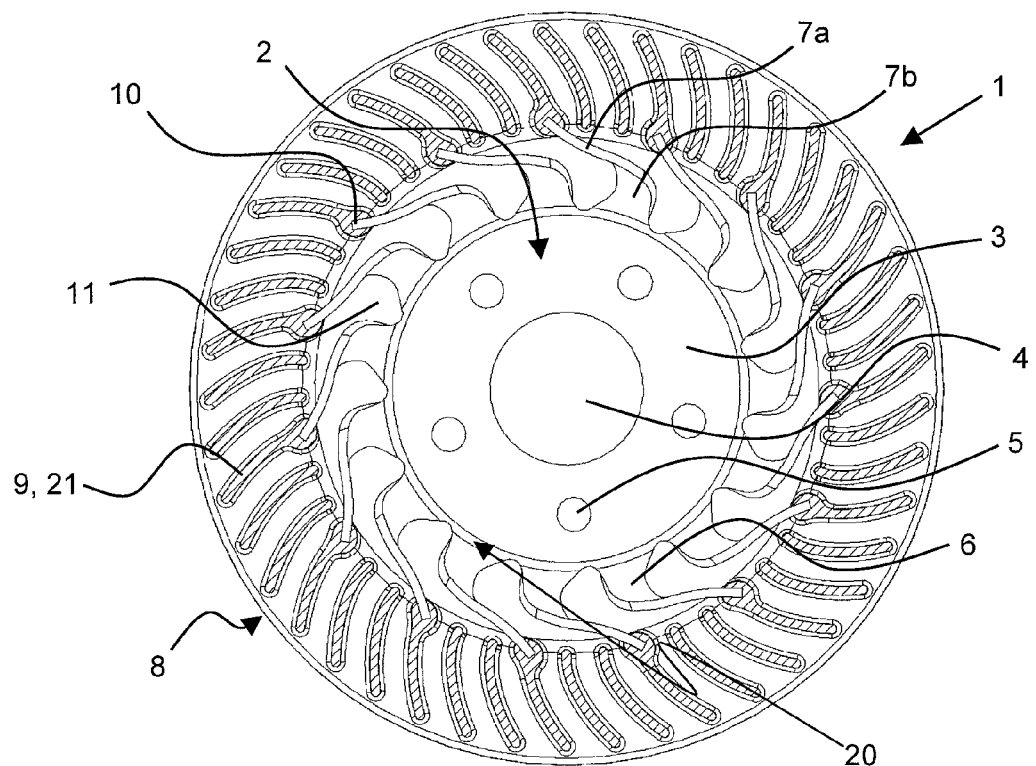
FIG. 2 shows a section through a brake disk in which the brake disk chamber is connected to the connection element of the brake disk friction ring in a positive and/or bonded manner in the radial direction.

FIG. 2 shows how this brake disk chamber 2 described in FIG. 1, which is manufactured with a uniform material and in one piece by a separating and shaping method, is connected to a brake disk 1 with a radially outwardly arranged brake disk friction ring 8. Brake disk friction ring 8 comprises two friction bands 14a, 14b arranged in parallel in an axial direction which are connected via segments or, as shown in FIG. 2, via cooling ribs 21. Brake disk friction ring 8 is manufactured from one material and in one piece. Hammerhead 10 of expansion elements 6 of one-piece brake disk chamber 2 and/or insert 20 is connected in the radial direction positively and/or in a bonded manner to individual segments 9 or cooling ribs 21 that are designed to be more stable to this end on their radially inward end. All further segments 9 or cooling ribs 21 that do not have any connection to one of hammerheads 10 are, on the other hand, stamped lighter and with a savings of material.

In this preferred embodiment of the invention, the connection between brake disk chamber 2 and brake disk friction ring 8 that is positive and/or bonded in the radial direction, is manufactured in a casting method. In it, brake disk chamber 2 that is manufactured from a single material and in one piece, is pre-warmed at the beginning in order to avoid shrinkage cavities between the connection of brake disk chamber 2 and brake disk friction ring 8 during the casting process. Brake disk chamber 2 is subsequently placed under light radial pressure into an ingot mold and a casting material, preferably grey cast iron or high-grade steel cast metal, poured around it. As a result of the axially pre-stressed sealing of brake disk chamber 2, it is ideally in a traction-neutral and pressure-neutral position at normal operating temperature of the brake disk friction ring 8 in regards to the thermally conditioned radial expansion.

In contrast to comparable brake disks of the state of the art, a significant advantage consists in the fact that in the preferred solution presented, care does not have to be taken that a non-bonded connection is guaranteed in the positive locking between hammerhead 10 and connection element 9 or cooling rib 21. However, this prerequisite is absolutely necessary in comparable brake disks in order to compensate thermo-mechanical expansions of brake disk friction ring 8 by the floating support resulting from it. The manufacture of such a non-bonded connection is, however, very difficult to control in casting technology, and also has the further disadvantage that the materials of brake disk friction ring 8 and of brake disk chamber 2 can not be freely selected, but rather, care must be taken that there are sufficiently large differences of the melting points of the two structural components.

In contrast to the above presented exemplary embodiment, a bonded connection between brake disk chamber 2 and brake disk friction ring 8 is not only technically simpler to realize, but rather has the additional advantage that the connection can receive higher tractive forces.

The reason why the connection can be realized so well without bonding resides in the fact that the radial expansion that takes place during the heating of brake disk friction ring 8 is compensated by the specific form of expansion elements 6, and not as in known solutions by a floating support of the expansion elements. Expansion elements 6 are stamped longer in the presented embodiment than the shortest distance between chamber ring 3 and brake disk friction ring 8 so that thermo-mechanical stresses are avoided by the radially elastic properties of expansion elements 6 in that expansion elements 6 allow a thermally conditioned enlarging of brake disk friction ring 8. At the same time, they have the advantage due to their freeform geometry of the radial and axial cross-section and the shaping and the alignment in the primary direction of rotation, of being able to withstand great mechanical stresses without having to be constructed excessively solidly and therefore heavy.

FIGS. 3 and 4 shows another embodiment of the brake disk 1. In analogy with FIGS. 1 and 2, brake disk chamber 2 is connected in a positive and/or bonded manner in the radial direction by hammerhead 10 to brake disk friction ring 8. In distinction to FIGS. 2 and 4, hammerhead 10 is not connected to a single connection segment 9 or cooling rib 21, but rather is positioned between segments 9a and 9b and cooling ribs 21a and 21b, as well as between friction bands 14a and 14b, so that the outer ends of hammerhead 10 positively engage, in particular, in the radial direction into friction bands 14a and 14b. In this solution, segments 9 and/or cooling ribs 21 are all constructed to be equally thick. In this manner, accumulations of mass in brake disk friction ring 8, from which hotspots would result, can be avoided.

As an alternative to the above, according to FIG. 5 another brake disk 1 is shown in which hammerheads 10 of expansion elements 6 are arranged between two adjacent segments 9a, 9b or cooling ribs 21, 21b of brake disk friction ring 8 as well as between friction bands 14a, 14b arranged in parallel in the axial direction. In distinction to the exemplary embodiment of FIGS. 3 and 4, the ends of hammerhead 10 of expansion element 6 are connected in a bonded manner, in particular in the radial direction, to segments 9a, 9b or cooling ribs 21a, 21b.

In an exemplary embodiment that is not shown, the ends of expansion elements 6, which ends face brake disk friction ring 8, are constructed with barbs that are clipped into connection openings of brake disk friction ring 8, so that a connection that is positive in radial direction is produced between brake disk chamber 2 and brake disk friction ring 8. This connection variant has the advantage that brake disk friction ring does not have to be positively connected in a casting method to brake disk chamber 2, but rather could be subsequently clipped into already-present brake disk friction ring 8. In this case, alternative materials, such as, for example, carbon fibers or ceramic material, could advantageously be used for brake disk friction ring 8, that would be an improvement as regards their friction properties and the total weight of brake disk 1.

Figure 6:
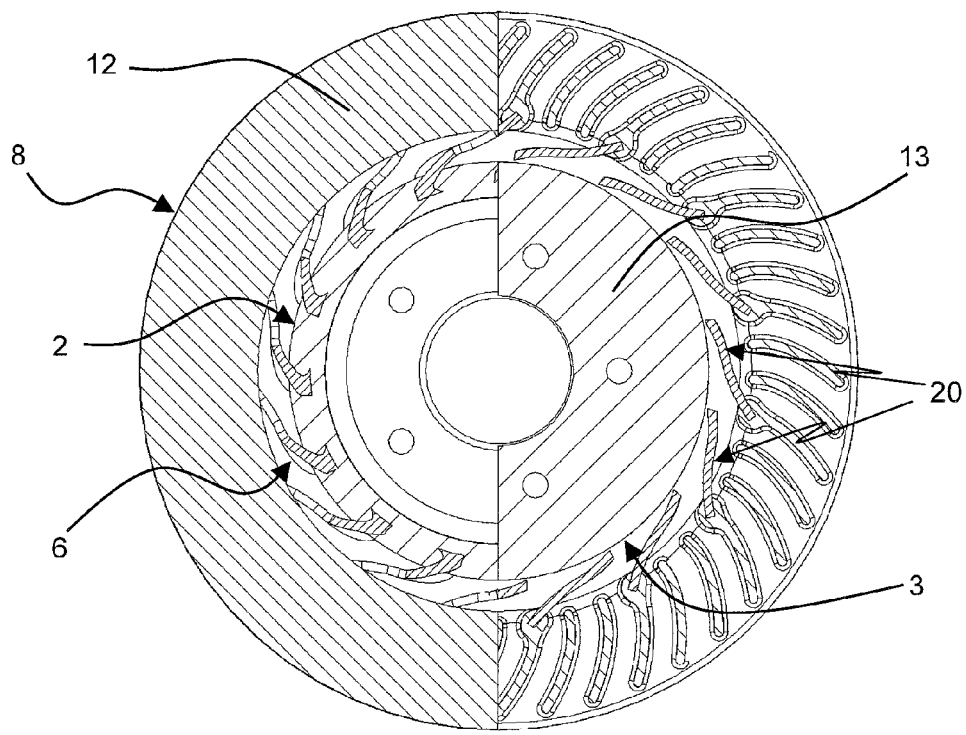
FIG. 6 shows a section through a brake disk in which the expansion elements of steel sheeting are connected to a cast chamber ring and to a cast brake disk friction ring of grey cast iron.
Figure 7:
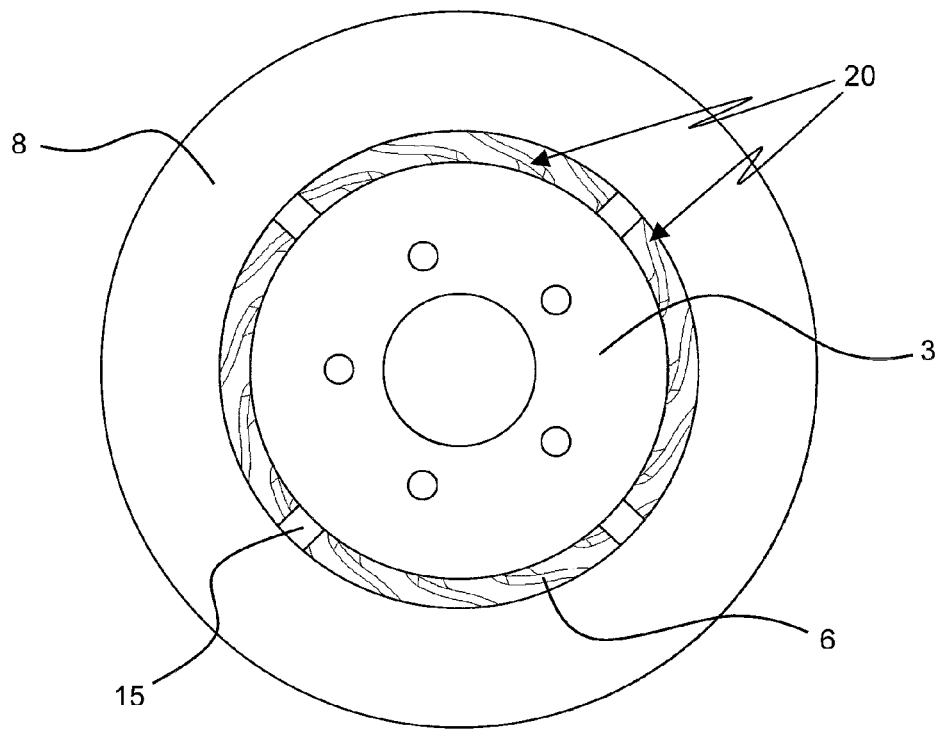
FIG. 7 shows a top view onto a brake disk that has not yet been completely worked and, in which the chamber ring and the brake disk friction ring are connected to one another by connection elements.

FIG. 6 and FIG. 7 show an embodiment of the invention in which brake disk chamber 2 is not manufactured as in the previous exemplary embodiments from the same material and in one piece, but rather, chamber ring 3 as well as expansion elements 6 are individual structural components. Expansion elements 6 are constructed as inserts 20 here. Furthermore, chamber ring 3 has a support surface 13 to be worked and brake disk friction ring 8 has a friction surface 12 to be worked. In order to produce brake disk 1 shown in FIG. 6, expansion elements 6 or inserts 20 that preferably consist of high-grade steel sheeting are placed under slight radial pressure into an ingot mold. The radially inward ends of expansion elements 6 are cast-in, in particular in radial direction, positively and/or in a bonded manner with chamber ring 3 that preferably consists of grey cast iron material or non-ferrous metal. In an analogous manner, the radially outer ends of expansion elements 6 are cast-in positively and/or in a bonded manner in the radial direction with brake disk friction ring 8. Moreover, during this casting process, redundant connection elements 15 are cast between chamber ring 3 and brake disk friction ring 8, as shown in FIG. 7. They stiffen the two structural components and, thus, relieve the load on expansion elements 6. It is possible by means of these connection elements 15 to rework support surface 13 and friction surface 12 by, for example, turning or grinding in a further work step without having to apply forces that are too strong in the axial direction on expansion elements 6 which forces could damage expansion elements 6. Thereafter, brake disk 1 is finished by punching off connection elements 15 between chamber ring 3 and brake disk friction ring 8.

Figure 9:
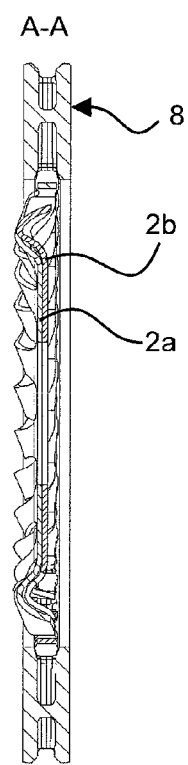

FIGS. 8 and 9 show a brake disk 1 with a brake disk chamber 2 that consists of two separate brake disk chambers 2a, 2b, whereby brake disk chamber 2b is arranged above brake disk chamber 2a. This exemplary embodiment is especially suitable for commercial vehicles; in that brake disk chamber 2 can withstand rather high mechanical stresses. In one embodiment (not shown), the expansion elements 6 of the two brake disk chambers 2a, 2b are bent in opposite axial directions and, therefore, together form a bulging form. In another embodiment (not shown), the two brake disk chambers are equally formed and arranged rotated in opposition in axial direction. Alternatively, more than two brake disk chambers 2 can be used for such a brake disk.

Figure 10:
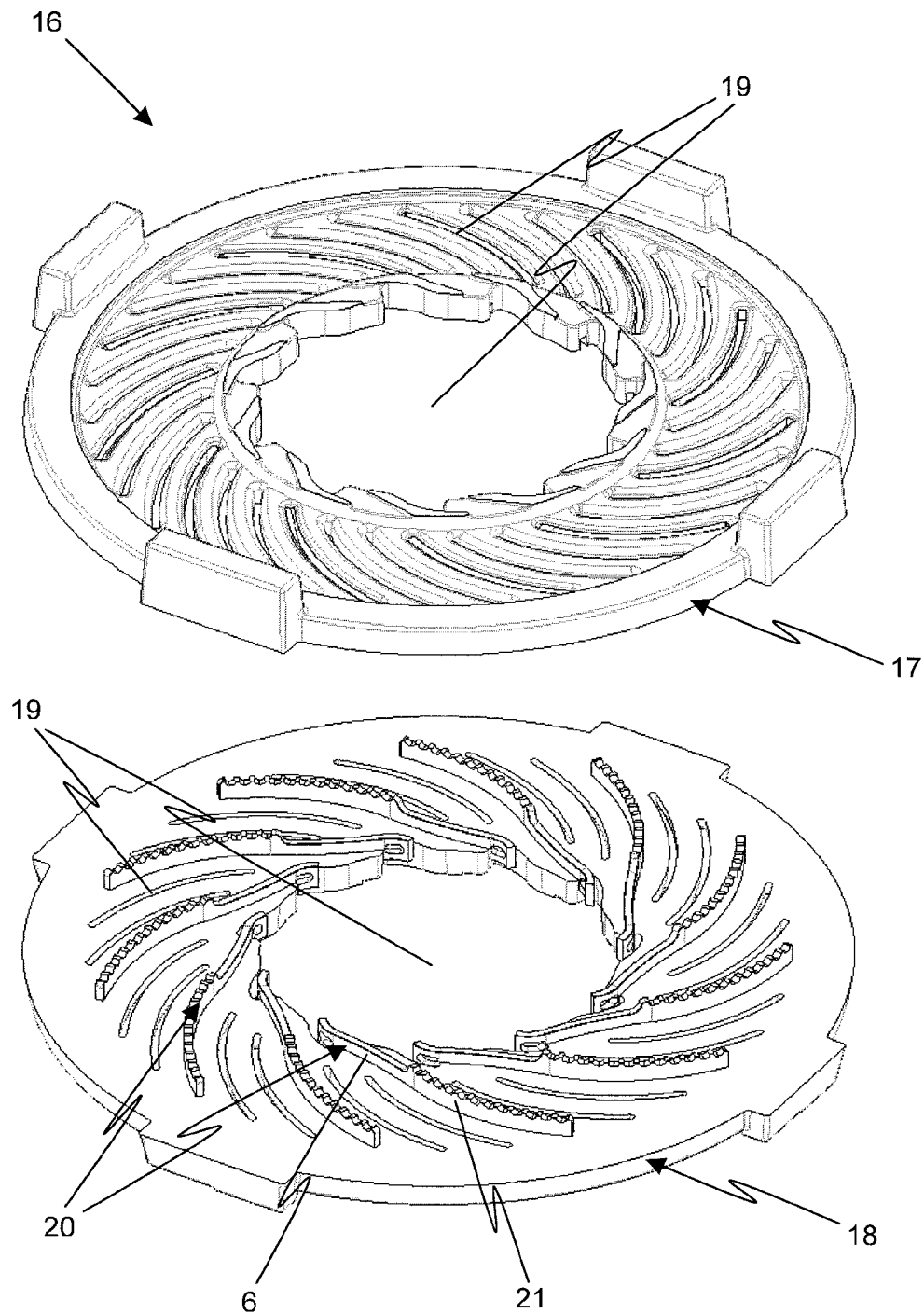
FIGS. 10 and 11 show a perspective view of a bipartite core before and after the adhering.
Figure 11:
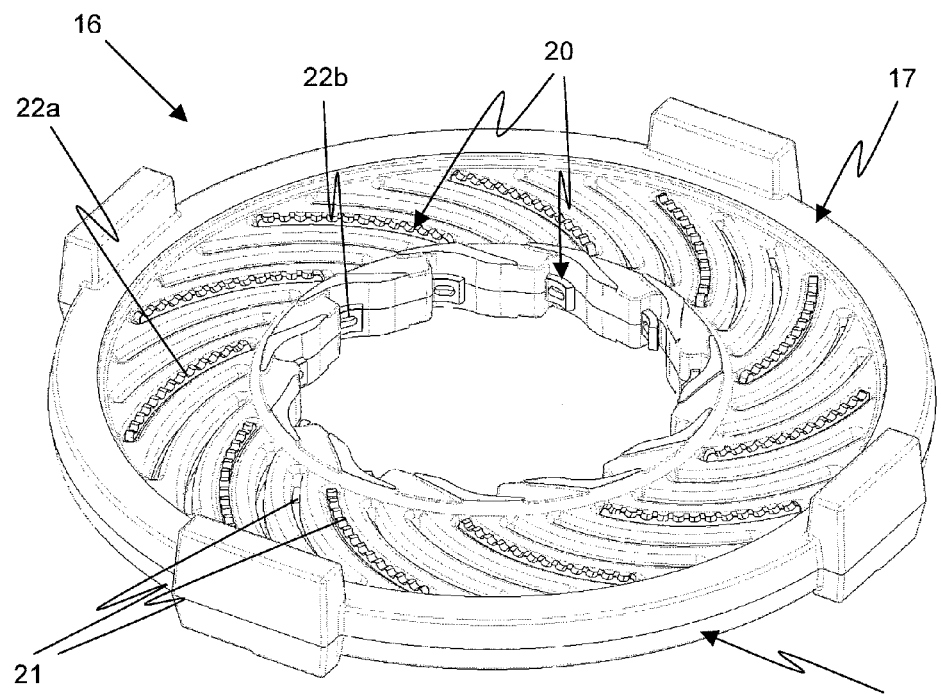

FIG. 10 and FIG. 11 show a bipartite core 16 with recesses 19, whereby core 16 consists of an upper part 17 and a lower part 18. Illustrated core 16 is used in another method in accordance with the invention for manufacturing brake disk 1, in which expansion elements 6 are cast using casting technology with brake disk friction ring 8 and chamber ring 3. The method can be used individually, but also in combination with the previous manufacturing method.

It is especially advantageous in the present method if the bipartite core is first treated with a wash since this improves the surface quality of cast brake disk 1. Then, as shown in FIG. 10, inserts 20 are placed in at least a few of recesses 19 between upper part 17 and lower part 18. Inserts 20 are in one piece in the present exemplary embodiment and form extension elements 6 as well as a few of cooling ribs 21. However, in an alternative embodiment cooling ribs 21 can also be formed at least partially by the insert. Subsequently, upper part 17 is connected, in particular, adhered to lower part 18 in accordance with FIG. 11. Inserts 20 are surrounded in such a manner here by core 16 that substantially only the contact areas 22a, 22b of inserts 20 are free. Then, core 16 is placed in a top- and bottom box which is customary in casting and not shown in FIGS. 10 and 11. Finally, brake disk friction ring 8, consisting of two friction bands 14a, 14b that are separate from one another, is cast in a positive and/or bonded manner in radial direction with inserts 20 on contact areas 22a and/or chamber ring 3 is cast on contact areas 22b in a positive and/or bonded manner in radial direction. In regards to a weight-reduced embodiment of brake disk 1, it is especially advantageous if only brake disk friction ring 8 is cast at first and, thereafter, chamber ring 3 is cast with a non-ferrous metal. It is also advantageous if brake disk friction ring 8 is also cast from a lighter non-ferrous metal for reasons of saving weight. However, if brake disk friction ring 8 is cast from non-ferrous metal, it should be coated in a subsequent method step with a material for controlling the introduction of heat whose melting point is so much higher in comparison to the non-ferrous metal, that a melting or deforming of brake disk friction ring 8 due to a very high brake disk friction ring load is largely excluded.

Figure 12:
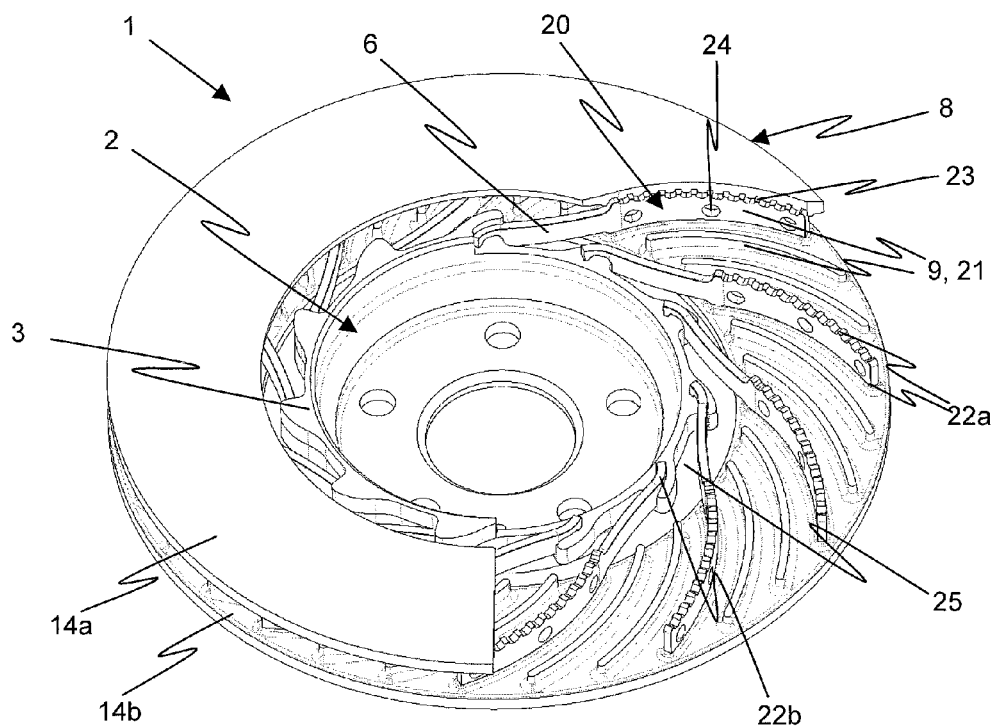
FIG. 12 shows a perspective view of an alternate embodiment of a brake disk in which the expansion elements and at least a few of the segments or cooling ribs are formed by inserts.

The internally ventilated brake disk 1 in FIG. 12 represents an especially preferred embodiment. It comprises a brake disk friction ring 8 and a brake disk chamber 2, whereby brake disk chamber 2 substantially comprises a chamber ring 3 and expansion elements 6. Expansion elements 6 are designed to be radially elastic and connect chamber ring 3 to brake disk friction ring 8. In regards to high strength as well as a good radial elasticity, expansion elements 6 preferably have an involute geometry. Brake disk friction ring 8 comprises two friction bands 14a, 14b distanced from one another in the axial direction that are connected to one another by segments 9. In this particularly preferred embodiment, segments 9 are designed as cooling ribs 21. Brake disk friction ring 8 is cooled in the interior during rotation by cooling ribs 21. Expansion elements 6 and at least a few of segments 9 and 21 are formed by inserts 20. In the area of brake disk friction ring 8, inserts 20 have teeth 23 in contact area 22a that melt away at least partially during the manufacture of the connection between inserts 20 and friction bands 14a, 14b using casting technology, so that a connection is produced that is bonded and/or positive in the radial direction. Chamber ring 3 is also cast using casting technology with inserts 20 in contact area 22b in a positive manner in the radial direction and/or in a bonded manner. In order to counteract the thermal loads during the breaking procedure, inserts 20 comprise circularly designed cooling openings 24 in the area of brake disk friction ring 8. Furthermore, chamber ring 3 comprises material recesses 25 on its outer circumference in the connection area to inserts 20, so that the weight of brake disk 1 is reduced. Chamber ring 3 receives a sawtooth-like profile as a result.

The present invention is not limited to the exemplary embodiments presented and described. In particular, the adaptation of the brake disk in accordance with the invention for use with an electrical wheel hub motor is conceivable. Modifications in the framework of the claims are possible as well as a combination of the features, even if they are presented and described in different exemplary embodiments.

The invention claimed is:

1. A brake disk particularly suited for motor vehicles, said brake disc comprising:
 a brake disk friction ring comprising two separately formed friction bands;
 a brake disk chamber, said brake disk chamber further comprising a chamber ring and expansion elements arranged radially on said chamber ring, said expansion elements having ends facing away from said chamber ring extending between and connected to said friction bands;
 wherein said expansion elements are connected to said brake disk friction ring in a non-floating, positive bonded manner;
 wherein said expansion elements extend in a top planar view of said brake disc from an outer circumference of said chamber ring to an inner circumference of said brake disc friction ring in an arced radial and circumferential direction of said brake disc such that a radially outward most end of each said expansion element overlaps a radially inward most end of an adjacent said expansion element and all of said expansion elements extend in the same radial and circumferential direction and have a length from said radially outward most end to said radially inward most end that is longer than the shortest radial distance between said outer circumference of said chamber ring and said inner circumference of said brake disc friction ring in the top planar view such that said expansion elements are radially elastic and adapt to a thermal deformation of said brake disk friction ring;
 wherein the connection between said expansion elements and said brake disk friction ring is a cast connection; and
 each said expansion element has a first bending area wherein said expansion element is bent in an axial direction and a spaced apart second bending area wherein said expansion element is bent in a radial direction that imparts a radial twist between said radially most inward end and said radially most outward end.

2. The brake disk according to claim 1, wherein said chamber ring and said expansion elements are formed as one piece from the same material.

3. The brake disk according to claim 1, wherein said chamber ring and said expansion elements are formed from different materials, said expansion elements comprising inserts with radially inward ends connected to said chamber ring in a non-floating, positive bonded manner.

4. The brake disk according to claim 1, wherein each two adjacent said expansion elements are arranged at a circumferential distance from one another.

5. The brake disk according to claim 1, wherein said expansion elements have a freeform, involute geometry in at least one of a longitudinal or cross section with a radius that changes in at least two dimensions.

6. The brake disk according to claim 1, wherein said brake disk has a primary direction of rotation, said ends of said expansion elements facing away from said chamber ring formed so as to face in or against the primary direction of rotation of said brake disk.

7. The brake disk according to claim 1, wherein said expansion elements have a cross section that decreases starting from an end facing said chamber ring to said end facing away from said chamber ring.

8. The brake disk according to claim 1, wherein the expansion elements have an undercut formed as a hammerhead shape on said end facing said brake disk friction ring.

9. The brake disk according to claim 1, wherein said friction bands are interconnected by segments, and wherein at least certain ones of said expansion elements have their respective said ends facing away from said chamber ring connected in a non-floating, positive bonded manner to said segments.

10. The brake disk according to claim 1, wherein at least certain ones of said expansion elements have their respective said ends facing away from said chamber ring connected in a non-floating, positive bonded manner between said bands.

11. The brake disk according to claim 10, wherein at least certain ones of said expansion elements have their respective said ends facing away from said chamber ring connected in a non-floating, positive bonded manner radially to one of said bands between adjacent said segments.

12. The brake disk according to claim 1, wherein said brake disk chamber is formed from a plurality of separate interconnected structural parts.

13. The brake disk according to claim 12, wherein said brake disk chamber comprises of a cast chamber ring and one or more expansion elements of steel sheeting connected in a non-floating, positive bonded manner to said chamber ring in the radial direction.

* * * * *